(12) United States Patent
Hevesi et al.

(10) Patent No.: US 7,049,064 B2
(45) Date of Patent: May 23, 2006

(54) METHOD FOR OBTAINING A SURFACE ACTIVATION OF A SOLID SUPPORT FOR BUILDING BIOCHIP MICROARRAYS

(75) Inventors: Laszlo Hevesi, Jambes (BE); Laurent Jeanmart, Lesve (BE); José Remacle, Malonne (BE)

(73) Assignee: Eppendorf Array Technologies SA (EAT), Namur (BE)

( * ) Notice: Subject to any disclaimer, the term of this patent is extended or adjusted under 35 U.S.C. 154(b) by 0 days.

(21) Appl. No.: 09/833,030

(22) Filed: Apr. 10, 2001

(65) Prior Publication Data

US 2002/0076709 A1 Jun. 20, 2002

(30) Foreign Application Priority Data

Sep. 1, 2000 (EP) ................................. 00870184

(51) Int. Cl.
*C12Q 1/68* (2006.01)
*G01N 33/53* (2006.01)
(52) U.S. Cl. ................... 435/6; 435/4; 435/7.1; 435/7.2; 435/DIG. 46; 435/DIG. 49; 436/518; 436/527
(58) Field of Classification Search ............ 435/4, 435/6, 7.1, 7.2, 287.1, 287.2, 287.7; 436/518, 436/528, 72, 127, 128, 139, 140, 142, 527
See application file for complete search history.

(56) References Cited

U.S. PATENT DOCUMENTS

| 3,939,096 | A | * | 2/1976 | Richardson ................. 502/241 |
| 5,624,711 | A | * | 4/1997 | Sundberg et al. ........... 427/261 |
| 5,986,066 | A | * | 11/1999 | Barner et al. ............ 530/391.1 |
| 6,329,209 | B1 | * | 12/2001 | Wagner et al. .............. 436/518 |

FOREIGN PATENT DOCUMENTS

| EP | 0803257 A2 | 10/1997 |
| EP | 0947246 A1 | 10/1999 |
| WO | WO 00/72018 A1 | 11/2000 |

OTHER PUBLICATIONS

Weetall, Preparation of Immobilized Proteins Covalently Coupled Through Silane Coupling Agents to Inorganic Supports, 1993, Applied Biochemistry and Biotechnology, 41:157-188.*
Fox et al., Organic Chemistry, 1994, Jones and Bartlett Publishers, Inc., 358-360.*
Carey et al., Advanced Organic Chemistry, 3rd Edition, 1990, Plenum Press, p. 647-648.*
MacBeath et al., "Printing proteins as microarrays for high-throughput function determination", Sep. 8, 2000, Science, 289:1760-1763.*
Zammatteo, et al. (2000) Comparison between Different Strategies of Covalent Attachment of DNA to Glass Surfaces to Build DNA Microarrays. Analytical Biochem. 280:143-150.
Befani, et al. (1998) Serum Amine Oxidase can Specifically Recognize and Oxidize Aminohexyl (AH) Chains on AH-Sepharose Support: Single-siep Affinity Immobilization. Biotechnol Appl. Biochem. 28: 99-104.
European Search Report EP00870184 dated Feb. 1, 2001, to which this application claims priority.
Allemand, et al. 1997. pH-dependent specific binding and combing of DNA. *Biophysical Journal,* 73:2064-2070.
Beier, et al. 1999. Versatile derivatisation of solid support media for covalent bonding on DNA-microchips. *Nucleic Acids Research,* 27(9):1970-1977.
Cheung, et al. 1999. Making and reading microarrays. *Nature Genetics Supplement,* 21:15-19.
Chrisey, et al. 1996. Covalent attachment of synthetic DNA to self-assembled monolayer films. *Nucleic Acids Research,* 24(15):3031-3039.
Duggan, et al. 1999. Expression profiling using cDNA microarrays. *Nature Genetics Supplement,* 221:10-14.
Ghosh, et al.
Guo, et al. 1994. Direct fluorescence analysis of genetic polymorphisms by hybridization with oligonucleotide arrays on glass supports. *Nucleic Acids Research,* 22(24):5456-5465.
Joos, et al. 1997. Covalent attachment of hybridizable oligonucleotides to glass supports. *Analytical Biochemistry,* 247:96-101.
Lamture, et al.
Pease, et al. 1994. Light-generated oligonucleotide arrays for rapid DNA sequence analysis. *Proc. Natl. Acad. Sci. USA,* 91:5022-5026.
Ramsay, et al. 1998. DNA chips: State-of-the-art. *Nature Biotechnology,* 16:40-44.

(Continued)

*Primary Examiner*—Padmashri Ponnaluri
*Assistant Examiner*—My-Chau T. Tran
(74) *Attorney, Agent, or Firm*—Knobbe, Martens, Olson & Bear, LLP

(57) ABSTRACT

The present invention is related to a method for making microarrays comprising the steps of:
submitting the surface of a solid support to an oxidation of chemical groups present on said surface in order to allow the formation of aldehyde functions upon the surface of said solid support,
covalently binding upon said aldehyde functions capture molecules designed for the detection, the identification, the quantification and/or the recovery of complementary target biological or chemical molecules of interest; said covalent binding resulting in an array comprising a density of at least 4 or more discrete regions/cm$^2$ of solid support surface, each of said discrete surface regions being bound with a species of capture molecules.

6 Claims, 2 Drawing Sheets

OTHER PUBLICATIONS

Rasmussen, et al. 1991. Covalent immobilization of DNA onto polystyrene microwells: The molecules are only bound at the 5' end. *Analytical Biochemistry,* 198:138-142.

Rogers, et al. 1999. Immobilization of oligonucleotides onto a glass support via disulfide bonds: A method for preparation of DNA microarrays. *Analytical Biochemistry,* 266:23-30.

Schena, et al. 1995. Quantitative monitoring of gene expression patterns with a complementary DNA microarray. *Science,* 270:467-470.

Schena, et al. 1996. Parallel human genome analysis: Microarray-based expression monitoring of 1000 genes. *Proc. Natl. Acad. Sci. USA,* 93:10614-10619.

Southern, et al. 1999. Molecular interactions on microarrays. *Nature Genetics Supplement,* 21:5-9.

Zammatteo, et al. 1997. Comparison between microwell and bead supports for the detection of human cytomegalovirus amplicons by sandwich hybridization. *Analytical Biochemistry,* 253:180-189.

Bowtell D.D.L. 1999 "Optiona available—from start to finish—for obtaining expression data by microarray" *Nature Genetics Supplement* 21:25-32.

Cheung et al. 1999 "Making and reading microarrays." *Nature Genetics Supplement* 21:15-19.

Lemieux et al. 1998 "Overview of DNA chip technology." *Molecular Breeding* 4:277-289.

Ramsay G. 1998 "DNA chips: state-of-the-art." *Nature Biotechnology* 16:40-44.

* cited by examiner

METHOD FOR OBTAINING A SURFACE ACTIVATION OF A SOLID SUPPORT FOR BUILDING BIOCHIP MICROARRAYS

CROSS-REFERENCE TO RELATED APPLICATIONS

This application claims priority to European Application Serial Number 00870184.9 filed on Sep. 1, 2000, the disclosure of which is incorporated herein by reference in its entirety.

FIELD OF THE INVENTION

The present invention is related to a method for obtaining a surface activation of a solid support that allows the binding of molecules (capture nucleotide sequences, capture antibodies, receptors etc.) by a functionalization of said solid support surface in order to improve the building of microarrays.

DESCRIPTION OF THE RELATED ART

State of the Art

Microarrays are powerful tools for simultaneous detection of many different target molecules present in a sample, preferably biomolecules like nucleotide sequences, ligands, antibodies, etc. For DNA biochips, the binding properties of the molecules present upon the array depend mainly on the number, the sequence and the length of the capture nucleotide sequences and the way they are addressed onto the support. DNA biochip technology uses microscopic arrays of DNA molecules immobilized on solid supports. Biochip microarray applications are numerous and used for biomedical analysis such as gene expression analysis, polymorphism or mutation detection, molecular diagnostic, DNA sequencing and gene discovery (Ramsay et al., *Nature Biotechnology* 16, p. 40 (1998)).

Such DNA microarrays are prepared by various methodologies. DNA can be synthesized in situ on glass surface by using combinatorial chemistry (Pease et al., *Proc. Natl. Acad. Sci. USA* 91, p. 5022 (1994)). This methodology produces DNA microarrays consisting of groups of oligonucleotides ranging in size from 10–25 bases whereas DNA microarrays prepared by micro-deposition with a robot can be of any length going from small oligonucleotides to 0.5–2 kb nucleotide sequences obtained for example after amplification by the polymerase chain reaction (PCR) (Zammatteo et al., *Anal. Biochem.* 253, p. 180 (1997)). Mechanical microspotting uses passive (pins) or active (ink jet nozzles) devices to deliver small quantities of DNA onto known regions.

Glass is a popular substrate for DNA biochips, primarily due to its low fluorescence, transparency, low cost and resistance to high temperature and many chemical reagents (Cheung et al., *Nature Genetics supplement* 21, p. 15 (1999)). It has a number of practical advantages over porous membranes and gel pads. Liquid cannot penetrate the surface of the support and target nucleotide sequences have direct access to corresponding capture nucleotide sequences without diffusing into pores (Southern et al., *Nature Genetics supplements* 21, p. 5 (1999)). Microscope slides are currently used in laboratories because they are easy to handle and adaptable to automatic readers.

Modifications of the glass surface properties by addition of polylysine (Schena et al., *Science* 270, p. 467 (1995)) or by hydrophobic coatings (Allemand et al., *Biophys. J.* 73, p. 2064 (1997)) have been proposed in order to obtain a direct binding of DNA nucleotide sequences. However, in these cases, the DNA strands are susceptible to removal from the surface under high salt or high temperature conditions. Therefore, covalent binding methods are preferred. DNA can be cross-linked by ultraviolet-irradiation to form covalent bonds between the thymidine residues in the DNA sequence and positively charged amine groups added on the functionalized slides (Duggan et al., *Nature Genetics supplement* 21, p. 10 (1999)). However, the location and the number of attached points of the DNA molecules are not well defined, so that the length and the sequences available for hybridization can vary with the fixation conditions. An alternative method is to fix DNA molecules by one of its extremities. Thus carboxylated (Joos et al., *Anal. Biochem.* 247, p. 96 (1997)) or phosphorylated DNA (Rasmussen et al., *Anal. Biochem.* 198, p. 138 (1991)) can be coupled on aminated support as well as the reciprocal situation (Ghosh et al., *Nucleic Acids Res.* 15, p. 5353 (1987)). Others have bound amino-terminal oligonucleotides to isothiocyanate activated glass (Guo et al., *Nucleic Acids Res.* 22, p. 5456 (1999)), to aldehyde activated glass (Schena et al., *Proc. Natl. Acad. Sci. USA* 93, p. 10614 (1996)) or to surfaces modified with epoxide (Lamture et al., *Nucleic Acids Res.* 22, p. 2121 (1994)). Thiol modified or disulfide modified oligonucleotides were also grafted onto aminosilane via heterobifunctional crosslinker (Chrisey et al., *Nucleic Acids Res.* 24, p. 3031 (1996)) or on 3-mercaptopropyl silane (Rogers et al., *Anal. Biochem.* 266, p. 23 (1999)). However, in these cases, the binding was not stable at high temperature. Recently, a more elaborate chemistry has been proposed for the construction of tethered molecules on the glass to which DNA can be attached (Beier et al., *Nucleic Acids Res.* 27, p. 1970 (1999)).

A situation in which the accessibility of a tethered single-stranded nucleotide sequence covalently attached to the surface could be combined with the specificity of long nucleotide sequences would provide a considerable improvement in the DNA biochip field.

Recently, Zammatteo et al. (*Analytical Biochemistry* 280, p. 143 (2000)) compared several coupling strategies currently used to covalently graft DNA onto a glass surface. They tested the carbodiimide mediated coupling of aminated, carboxylated and phosphorylated DNA on carboxylic acid or amine modified glass supports. These methods were compared with the binding of aminated DNA to aldehyde activated glass. They concluded that the fixation of aminated DNA to aldehyde modified surface gives the best coupling procedure to build DNA microarrays in term of coupling yield, rate of reaction in the absence of coupling agent. Besides glass, polymers are becoming increasingly used for microarray and for the miniaturization of the biological assays due to the development of the microfluidic technology and the "lab on a chip" concept. In order to perform the assays, biological or ligand molecules have to be fixed on the surface of the polymer and the requirement of a simple method of polymer activation would be valuable.

AIMS OF THE INVENTION

The present invention provides a new process for obtaining a surface activation (functionalization or modification) of a solid support that is easy and rapid to perform in order to introduce functions upon said solid support suitable for covalent binding of bio- or chemomolecules and for the building of improved biochips or chemochips microarrays.

A preferred embodiment of the present invention is to provide by said method, improved chip microarrays that will increase the detection sensitivity (increased coupling yield, rate of reaction, etc.) of target molecules upon the microarrays of said chips allowing their identification and/or quantification and/or recovery.

SUMMARY OF THE INVENTION

The present invention is related to a method for the activation (modification or functionalization) of a solid support surface by an oxidation of chemical groups present upon said surface, allowing the formation of aldehyde functions at the surface of said solid support, said aldehyde functions being suitable for covalent coupling (binding or linkage) with biological or chemical molecules.

The solid support according to the invention is a solid support suitable for microarrays, especially for "biochips" or "chemochips", comprising at specific locations capture molecules (such as capture nucleotide sequences, capture antigens or antibodies, capture ligands or receptors, etc.) specific for complementary molecules (target nucleotide sequences, target antibodies or antigenic structures, target receptors or ligands, etc.) to be detected, quantified and/or recovered from a sample.

The microarrays are also suitable for the preparation of chemochips based upon the same principle for the detection, the quantification and/or the recovering of specific chemical molecules, such as molecules obtained by combinatorial chemistry.

Therefore, the present invention is related to a method for making microarrays, comprising the steps of:
 a) submitting the surface of a solid support to an oxidation of chemical groups present upon said surface in order to allow the formation of aldehyde functions upon the surface of said solid support, and
 b) covalently coupling upon said aldehyde functions capture molecules designed for the detection, the identification, the quantification and/or the recovery of complementary target biological or chemical molecules of interest; said covalent binding resulting in (being made in order to obtain) an array comprising a density of at least 4, 10, 16, 20 or much more discrete regions per $cm^2$ of solid support surface, each of said discrete surface regions being bound (linked) with a species of capture molecules.

The locations of the discrete regions (or spots) have a diameter comprised preferably between 10 and 500 μm and are separate by distances of similar order of magnitude, so that the array of the solid support comprises between 10 and 250000 discrete regions or spots upon a surface of 1 $cm^2$, but preferably between 10 and 1000 spots upon a surface of 1 $cm^2$.

However, it is also possible to prepare discrete regions or spots smaller than 1 μm or less upon which the specific "capture molecules" are fixed.

Preferably, in the method according to the invention, one may use a glass solid support upon which, previously to the oxidation, olefinic silanes are first grafted on hydroxyl functions present on the surface of the glass solid support.

According to other embodiments of the present invention, the solid support is a (preferably transparent) plastic polymer like polycarbonate, polyethylene or PPMA polymer containing olefinic groups or a solid support upon which olefinic groups are incorporated by chemical (grafting) reaction or by a physical deposition of a layer or dendritic compounds bearing olefinic molecules, for instance by the addition of a chlorosilane derivative.

Preferably, the oxidation step of the surface of the solid support allowing the formation of aldehyde functions is obtained in the presence of low concentrations of permanganate and periodate in a buffered aqueous solution.

However, other mild oxidants selected by the person skilled in the art and giving similar aldehyde oxidation products can be used in the method according to the invention. The aldehyde functions are identified upon the solid support by XPS technology or Tollens test as described in example 10.

According to the invention, the target molecules may be present in a sample (biological sample), such as a clinical sample extracted from blood, urine, vessels, saliva, pus, serum, tissue, fermentation solutions or culture media. Said target compounds are preferably isolated, cleaved, purified and/or amplified (if necessary) by known methods by the person skilled in the art before their detection and/or quantification upon the microarrays according to the invention.

Therefore, said capture molecules present upon the microarrays are specific for said complementary target molecules and are preferably parts of coupling pairs, such as complementary strands of nucleotide sequences, antibodies or active hypervariable portions of an antibody/antigenic structure or haptens, receptors/ligands, biotin/streptavidin molecules, possibly coupled with other chemical or biochemical molecules or any double pairs binding system suitable for the identification, characterization, screening and recovery of biological or chemical libraries of molecules, for biomedical analysis such as gene expression analysis, polymorphism or mutation detection, molecular diagnostic, DNA sequencing and gene characterization.

The present invention is also related to the microarrays solid support obtained according to the method according to the invention and their use for the detection, the quantification and/or the recovering of target biological or chemical molecules of interest according to methods well-known by the person skilled in the art and preferably according to the method described in the international patent application PCT/BE00/00054.

The present invention will be described in details in the following non-limiting examples in reference to the enclosed drawings.

DETAILED DESCRIPTION OF THE PREFERRED EMBODIMENTS

One of the constraints of a biochip is that detection of the biological molecules upon said biochip is performed either by colorimetric or fluorescent methods. Plastic polymers physical properties like transparency or fluorescence are easily altered by using organic solvents. This drawback exists also with polycarbonate plastic used in a compact disc support (CDs), which is easily altered by organic solvents.

According to the invention, the olefinic groups present on the surface of said solid support are oxidized into aldehyde in the presence of low concentrations of permanganate and periodate in a buffered aqueous solution, which can be advantageously applied to most of the plastic polymers without damaging the chemical or even more the physical properties of the polymer.

Other transparent polymers like PMMA or polyethylene are also well suited for functionalization according the process of the present invention.

The invention is easily applicable to most support material, either if they contain olefinic groups or by a first incorporating these olefinic groups at the surface of the support either by chemical reactions or by physical deposit of such olefinic bearing molecules at the surface of the support.

Figure 1:
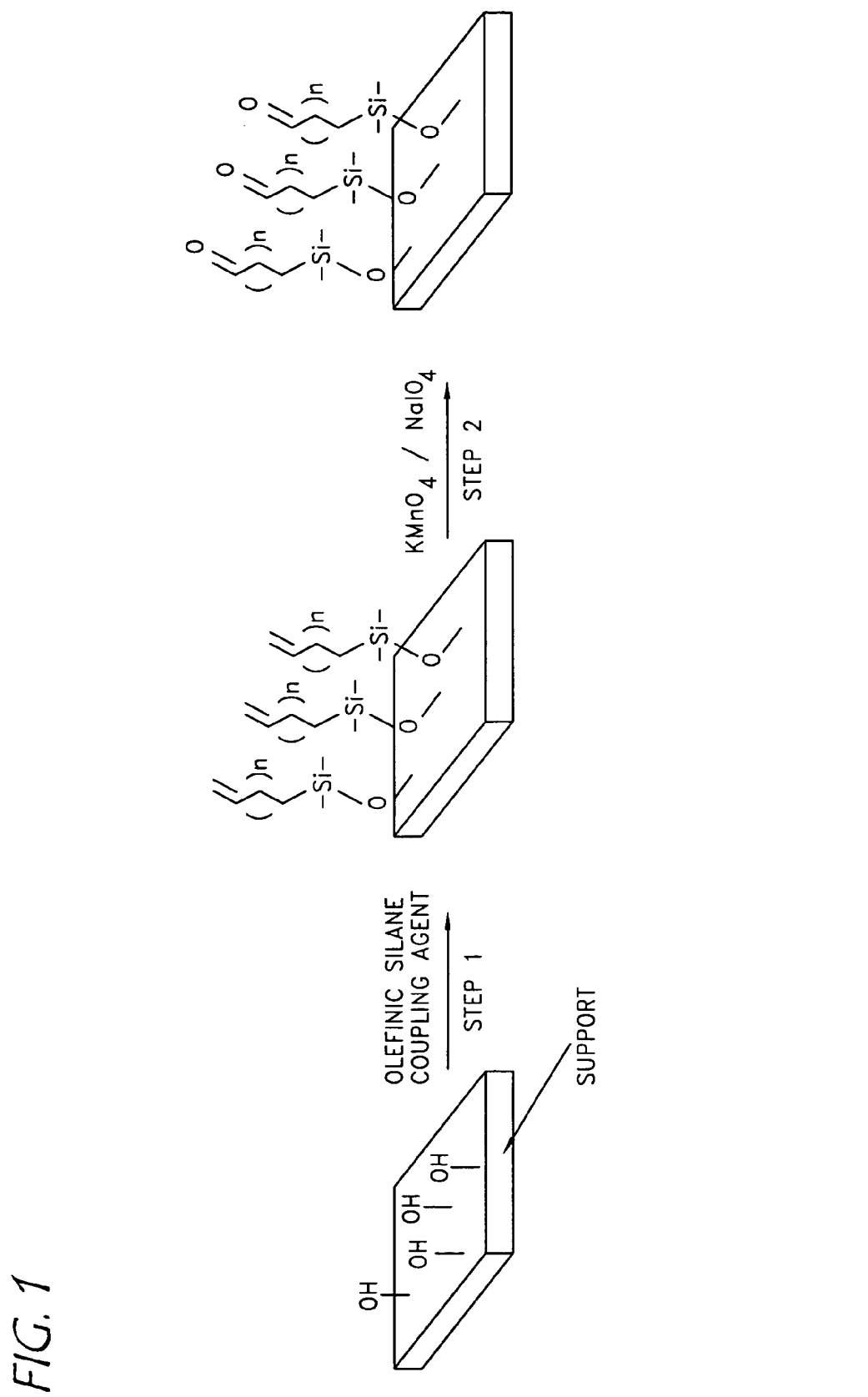
FIG. 1 gives a schematic presentation of the functionalization reaction for glass surface.

In one embodiment of the invention, glass is used as support for biochip microarray construction by first attachment of olefinic groups using chlorosilane derivatives and then oxidation of these olefinic groups into aldehyde (FIG. 1). Preferably, the olefinic groups are distant from the solid support by a spacer of at least 2 atoms. Example 4 shows that olefinic groups present at the extremity of a chain of 4 or 6 carbon atoms give much better hybridization yield than olefinic groups with only one carbon as spacer from the hydroxyl of the glass.

In another embodiment of the invention, acrylic-polyacrylic resins are oxidized by the same method. These acrylic-polyacrylic resins have been successfully oxidized when present on another support like polycarbonate of the CDs. The fact that no organic solvent is used, makes the method well adapted for supports like polycarbonate. The present invention is particularly well suited for the oxidation of olefinic groups present at the extremities of long or dendritic molecules, since the presence of a spacer from the surface was found to be very favorable for the DNA hybridization yield (see also example 4).

Mild oxidation of olefinic groups into aldehydes can also be performed with oxidative methods such as ozonolysis. The results obtained were however less quantitative. A decrease of about 20%. The transfer of such method to industrial production is however much more complicated to implement with the ozonolysis method than with the permanganate/periodate. The main reasons are the fact that the oxidation has to be performed in organic solvent and a low, well controlled temperature was observed with ozonolysis treatment than with the permanganate/periodate oxidation. In a preferred embodiment of the invention an aldehyde bearing surface can be used for the deposit of DNA aminated capture nucleotide sequences. The reaction of the amino groups with the aldehyde is a fast reaction making the invention well suited for microarray construction by using small solutions performed at room temperature and submitted to evaporation. Microarray construction with spots of between 0.05 to 0.5 mm used droplet or pin deposit droplet in the range of 0.1 to 5 nl. In another embodiment, the imine formed bond is then reduced by incubation with sodium borohydride or another reducing agent in order to stabilize the bond and inactivate the excess of free aldehyde.

In another embodiment of the invention, molecules are bound to the aldehyde surface, being the first member of a binding pair. The second member being the molecule to be detected or identified or quantified in biological or chemical samples.

Preferably, the first member is an antigen (hapten) or antibody, a ligand or a receptor, a biotin or a streptavidin but also peptides, proteins or DNA which are recognized by complementary or other binding molecules. For example DNA specific sequences attached to a support can be used to detect DNA binding proteins. One specific application is the detection of transcriptional factors.

The invention is particularly well suited for construction of large numbers of bound molecules on the same surface and its automation. Thus libraries of chemicals, peptides, ligands, antigens are easily constructed on such support given the facility of deposit of molecules by robot. The solid supports are then easily used for screening libraries of molecules either biologically (like clones, plasmids bank or phage display molecules) or chemically constructed. Chemical libraries are now easily constructed due to the progress in the combinatory or parallel synthesis of molecules.

EXAMPLES

Materials

Ethanol, Maleic acid, NaCl, and SDS (sodium dodecyl sulfate), are from Merck (Darmstadt, Germany). $NaBH_4$, Tween 20, streptavidin-cy3 and streptavidin-gold are from Sigma (St Louis, Mo., USA). [$\alpha$-$^{32}P$] dCTP are from Dupont de Nemours (Boston, Mass., USA). Oligonucleotides are from Eurogentec (Seraing, Belgium). Hybridization chambers of 65 µl are from MJ Research INC (Watertown, Mass., USA). Oligo dT nucleotide sequence, the reverse transcriptase Superscrip II and Rnase H are from Gibco BRL (Paisley, UK)). Rnasin ribonuclease inhibitor is from Promega (Madisson, USA). Silylated (aldehyde) slides are from Cell Associates (Houston, Tex., USA).

The arrayer and colorimetric microarray reader are from WOW (Naninne, Belgium) using 250 µm pins from Genetix (UK). The liquid scintillation analyzer LS 60001C is from Beckman Instruments (Fullerton, Calif., USA); Aqualuma is from Lumac LSC (Groningen, Netherlands). High Pure PCR Product Purification Kit, dNTP, uracil-DNA-Glycosylase and Biotin-16-dUTP are from Boerhinger (Mannheim, Germany). Hybridization solution and silver blue revelation solution are from AAT (Namur, Belgium). Taq DNA polymerase is from Biotools (Spain). 9600 thermocycler is from Perkin Elmer (Foster City, Calif., USA). The microarray fluorescent reader is a array-scanner GSM 418 from Genetic Microsystem (Woburn, Mass., USA). Allytrichlorosilane, 5-hexenyltrichlorosilane and 7-octenyltrichlorosilane are from ABCR (Germany, Karlsruhe). Potassium permanganate, sodium periodate and toluene are from Aldrich chemical (Milwouka, Wis., USA). Non treated glass slides were purchased from Knittel glaser (Germany).

Example 1

Glass Activation

Glass bearing silanol functions were first grafted with olefinic silane coupling agent in order to cover this surface with olefinic groups. Glass slides were immersed for 1 h in a $10^{-3}$ M anhydrous toluene solution of 7-octenyltrichlorosilane. The samples were then cleaned by dipping in fresh toluene under vigorous agitation to remove the excess physisorbed molecules and then dried in oven at 120° C. during 10 min.

Example 2

Olefinic Oxidation

The olefinic functions present either on glass or polymers were oxidized in the following way. The slides were dipped into a solution of 0.1M Phosphate buffer at pH 7.5 containing 20 mM NaIO$_4$ and 0.5 nM KMnO$_4$ under mild agitation during 1 h, washed twice with water, dried under Nitrogen flow and stocked under vacuum. Glass slides activated in this way were called diaglass slides.

Example 3

Fixation Capacity of Aminated DNA Nucleotide Sequences of the Diaglass Slides

Cytomegalovirus DNA sequence is used as template for capture nucleotide sequence production. Capture nucleotide sequences are synthesized by PCR using primers and method described elsewhere (Zammatteo et al., *Anal. Biochem.* 253, pp. 180–189 (1997)). The MIE4 primer bears an amine group at its 5' terminus and the length of amplicons is 257 bp.

Radioactive labeling is carried out by the incorporation of [α-$^{32}$P] dCTP during the PCR amplification. Amplified DNA are separated from unincorporated nucleotides and primers by chromatography on High Pure PCR Product Purification Kit. DNA concentration is then measured by its absorbency at 260 nm. The purity of the fragment is checked by agarose gel electrophoresis.

Aminated capture nucleotide sequences are diluted to a concentration of 300 nM and 150 nM in either SSC3× buffer pH 5, 0.01% SDS or SSC3× buffer pH 5. Nucleotide sequences are dispensed on the activated glass slides with an arrayer. Glass were obtained either as described in example 2 or were purchased from Telechem (Cell Associates, Houston, Tex., USA). Each array is composed of 100 spots (10×10). The spots are 400 µm in diameter and distance between two adjacent spots is 500 µm. After 1 h incubation at 23° C., glass samples are washed once with 0.1% SDS, twice with water, then incubated for 5 min with sodium borohydride solution, one with water and finally 3 min with boiling water to obtain single stranded nucleotide sequences on the surface.

Controls arrays (100% fixation) do not include this washing step. Glass samples including the array are cut and quantification of the binding is done by counting the amount of $^{32}$P-DNA bound to the glass support with a liquid scintillation counter.

The amount (in moles) of bound DNA in each array is calculated in reference to the 100% fixation controls. The spot diameter being 0.4 mm, the amount of DNA nucleotide sequence fixed per cm$^2$ was calculated; a value of 220 and 230 fmoles/cm$^2$ was obtained, respectively when the spotting was performed with solution at 150 or 300 nM in capture nucleotide sequences. By comparison, the values were 20 and 30 for the Telechem slides.

Example 4

Influence of the Chain Length of the ω-olefinic Silane Coupling Agent on the Yield of DNA Attachment The first step of the functionalization is the grafting on the glass slides of three ω-olefinic silane coupling agents having different chain length. These were allyltrichlorosilane (C3), 5-hexenyltrichlorosilane (C6) and 7-octenyltrichlorosilane (C8).

The experimental procedure for their fixation on the glass silanal group and their oxidation in aldehyde is described in examples 1 and 2.

The protocols for capture nucleotide sequence synthesis and fixation on glass slides are described in example 3. The only difference is that the capture nucleotide sequence is multibiotinylated and not radiolabeled and were spotted at 200 nM.

Slides are incubated 45 min at room temperature with 800 µl of streptavidin-cy5 conjugate. After incubation, slides are washed 5 times 1 min with buffer 1, then rinsed twice with water. The detection is performed using the array-scanner GSM 418. Each spot was then quantified by a home made quantification software. The results gave a value of fluorescence of 2 for the C3, 234 for the C6 and 242 for the C8 ω-olefinic silane coupling agent.

Example 5

Detection of Target Nucleotides Amplicons on Long Capture Nucleotide Sequences Fixed on Glass Slides The protocols for capture nucleotide sequence synthesis and fixation on glass slides are the ones described in example 3. The capture nucleotide sequences were spotted from a 200 nM solution.

Cytomegalovirus DNA sequence is used as template for target DNA production. Targets are synthesized by PCR using primers and method described elsewhere (Zammatteo, et al., (1997). *Anal. Biochem.* 253, 180–189). Target are 437 pb in length. Labeling is obtained by the incorporation of Biotin-16-dUTP in a ratio to dTTP of 1:1 during the PCR amplification. DNA concentration is then measured by its absorbency at 260 nm. The purity of the fragment is checked by agarose gel electrophoresis.

The hybridization solution is composed of 2×SSC pH 7, 4% SDS, 100 µg/ml salmon sperm DNA and 10 nM of 437 pb biotinylated targets CMV in a final volume of 70 µl. This solution is loaded on the array framed by an hybridization chamber which is then sealed by a coverslip. Slides are then placed on a heating block for 5 min at 98° C. to denature target amplicons. Hybridization is carried out at 50° C. for 2 h. Slides are then washed 4 times and the fluorescence measured as in example 4. The results gave a value of 217 for the hybridization performed on the Diaglass slides and 46 for the Telechem.

Example 6

Influence of Capture Nucleotide Sequence Concentration for the Detection of cDNA Target on Long Capture Nucleotide Sequences Fixed on Glass Slides Reverse transcription is done on 2 µg of mRNA extracted from hepatocytes in primary culture using the following procedure.

In a sterile, nuclease free microtube, 1 µg of the oligo dT nucleotide sequence is added to mRNA extracted from rat liver. Nuclease free water is added to obtain a final volume of 10 µl. This mixture is denatured for 10 min at 70° C. and then chill on ice for 5 min. The reverse transcription is performed by adding the following components to the annealed nucleotide sequence template 4 µl of First Strand Buffer supplied with the reverse transcriptase (250 mM Tris-HCl pH 8.3, 375 mM KCl, 15 mM MgCl$_2$), 2 µl of DTT 0.1M, 40 units of Rnasin ribonuclease inhibitor, 500 µM dATP, 500 µM dCTP, 500 µM dGTP, 130 µM dTTP, 70 µM biotin dUTP. The reaction mixture is gently mixed by flicking the tube and incubated for 2 min at 42° C. 300 units of reverse transcriptase SuperScript II are added to the mixture and tubes are incubated at 42° C. for one hour. The reaction is stopped by heating at 70° C. for 15 min. To remove RNA complementary to the cDNA, a treatment with Rnase H is performed at 37° C. for 20 min.

The protocol for capture nucleotide sequence fixation on glass slides is described in example 3. The aminated capture nucleotide sequences were 400 bases long and were specific for the Cytochrome P450 3a1 gene.

Figure 2:
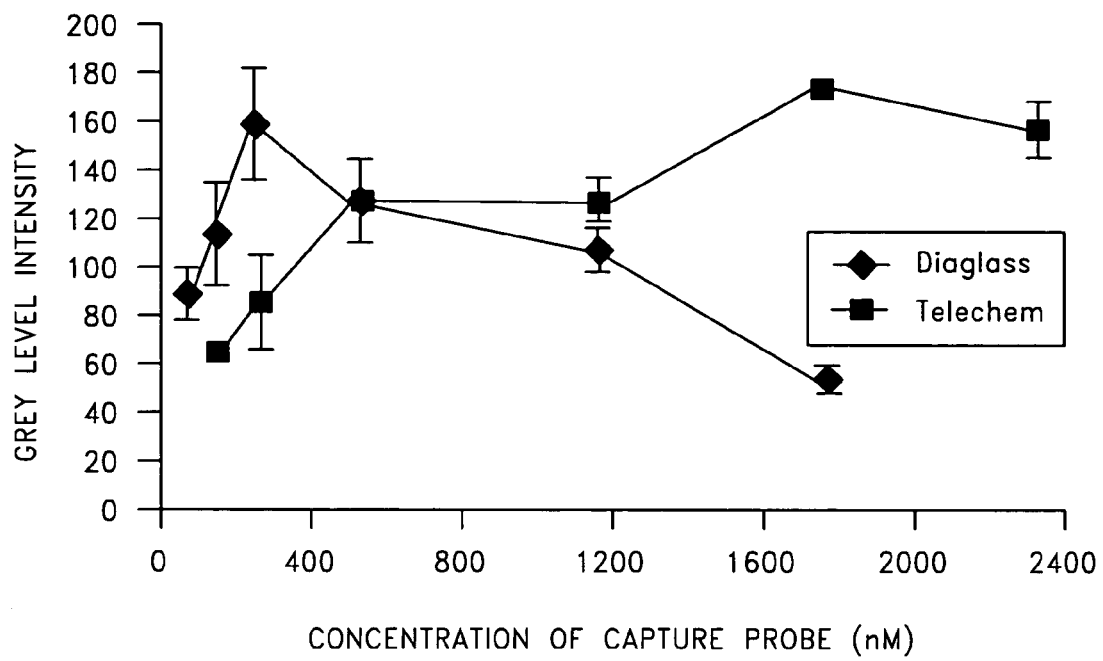
FIG. 2 demonstrates the fixation capacity of the functionalized glass for aminated DNA nucleotide sequences.

The hybridization protocol is described in example 5 using as target the total reverse transcription product and 2 nM biotinylated CMV amplicons as positive control. Capture nucleotide sequence corresponding to the positive control is included on the array. The hybridization is carried out for 16 h at 60° C. The results were obtained in fluorescent scanning and are presented in figure 2. The maximum hybridization was obtained using 6 times less capture nucleotide sequence concentration for the Diaglass than for the Telechem.

Example 7

Detection of Target Nucleotides Amplicons on Short Capture Nucleotide Sequences Fixed on Glass Slides Capture Nucleotide Sequence Immobilization The protocol for capture nucleotide sequence fixation on glass slides is the one described in example 3. The aminated capture nucleotide sequences are spotted at a concentration of 3000 nM.

The target DNA is a fragment (587 bp) of the femA gene sequence from S. aureus which is obtained by PCR using the following degenerated primers:

```
APcons3-1: 5' TAAYAAARTCACCAACATAYTC 3'

APcons3-2: 5' TYMGNTCATTTATGGAAGATAC 3'
``` where Y is C or T, R is A or G, M is A or C, N is A, G, C or T)

The PCR is performed in a final volume of 50 µl containing: 2.5 mM $MgCl_2$, 75 mM Tris-HCl, pH 9.0, 50 mM KCl, 20 mM $(NH_4)_2SO_4$, 0.5 µM of the, 0.1 µM of the primers, 200 µM of dATP, 200 µM of dCTP, 200 µM of dGTP, 150 µM of dTTP, 50 µM of biotin-16-dUTP, 0.5 U of uracil-DNA-Glycosylase, 1.25 U of Taq DNA polymerase, 5 ng of plasmid containingfema gene. The reactions are first denatured at 94° C. for 5 min and then cycled 40 times in a DNA 9600 thermocycler using the following temperatures and cycle times: 94° C. for 30 s, 49° C. for 45 s, 72° C. for 30 s. A final extension step of 10 min at 72° C. is performed. PCR products are directly used or frozen. Water controls are used as negative controls of the amplification.

The hybridization protocol was described in example 5. Slides are incubated 45 min at room temperature with 800 µl of streptavidin labeled with colloidal gold 1000× diluted in buffer 2. After incubation, slides are washed 5 times 1 min with buffer 1, then rinsed once with water. Gold catalyses silver precipitation using silver blue revelation solution (AAT, Namur, Belgium). The slides are incubated 3 times 10 min with 800 µl of revelation mixture, then rinsed with water, dried and analyzed using a microarray reader. Each spot are then quantified by a home made quantification software. The results gave a hybridization value of 181 for the Diaglass slides and 111 for the Telechem.

Example 8

Detection of Short Target Nucleotides on Complementary Capture Nucleotide Sequences Fixed on Glass Slides The protocol for capture nucleotide sequence fixation on glass slides is described in example 3. Aminated capture nucleotide sequences of 27 bases are spotted at a concentration of 1600 nM.

The hybridization protocol is described in example 5. 30 nM of biotinylated target DNA of 27 bases are hybridized on the array for 30 min at 50° C. and the detection was performed as in example 7. The results gave a hybridization value of 238 for the Diaglass slides and 61 for the Telechem.

Example 9

Detection of Antibodies Fixed on Glass Slides

The presence of proteinA fix antibody by their Fc fragments which facilitate antibody/antigen recognition antigen. Covalent fixation occurs between free amines of proteinA and aldehyde functions of glass slides.

Coating solution is composed of 100 µg/ml of proteinA in PBS and 0.01% SDS for Diaglass slides and without for Telechem slides. Slides are then incubated in this mixture (15 ml/slide) for 1 h at room temperature and then washed 3 times 2 min with PBS/0.02% Tween 20 and rinsed twice with water for 2 min. After this treatment, slides are saturated for 2 h at room temperature in PBS/10% milk powder. Finally, slides are washed 5 times 1 min with PBS and rinsed with water.

Figure 3:
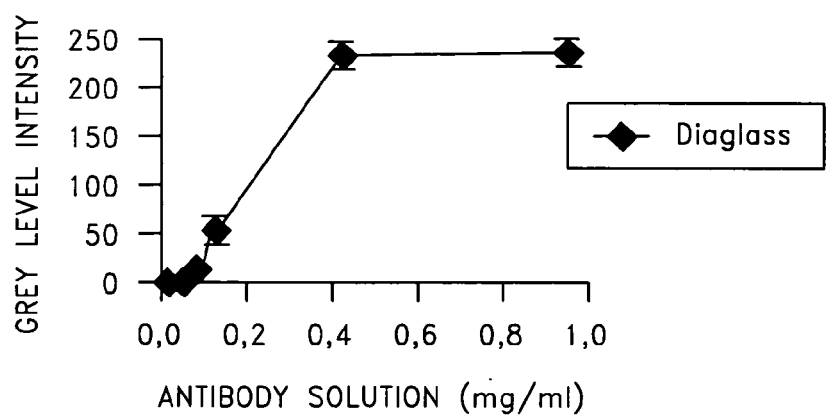
FIG. 3 demonstrates the fixation yield of antibodies captured after spotting on functionalized glass which have reacted with protein A.

Antibodies are printed onto glass slides with the arrayer. Increasing concentrations of anti-streptavidin antibodies are spotted ranging from 1.5 µg/ml to 1 mg/ml in solutions composed of 3×SSC (Sodium Saline Citrate) pH 5 and 0.01% SDS for Diaglass slides and without for Telechem slides. Spotted slides are incubated 1 h at room temperature before being washed twice 1 min with 1×PBS/0.02% Tween 20 and rinsed 3 times 1 min with water. The detection was performed using Cy5-streptavidin as in example 4. A saturation curve is obtained with a maximum fixation for a 0.4 mg/ml solution of antibody (FIG. 3).

Example 10

Characterization of the Modified Glass Surface

The different steps of the functionalization of the glass surface were characterized by X-ray photoelectron spectroscopy (XPS) and contact angle measurements. The C 1s line for Diaglass and Telechem slides can be resolved in two components, one at 285.0 eV corresponding to carbon in an aliphatic environment ($CH_x$) and an other, characteristic of the carbonyl from the aldehyde function at 288.7 eV. Furthermore, Diaglass slides reacted positively to the Tollens test (characteristic test of aliphatic aldehydes), giving a silver mirror. On the other hand, glass slides alone or with carboxylic acid or alcohol functionalization do not give positive result in this test.

The Tollen's reagent was prepared as follows: dissolve 3 g of silver nitrate in 30 ml of water (solution A) and 3 g of sodium hydroxide in 30 ml of water (solution B). When the reagent is required, mix 2 ml of the two solutions in a clean test tube and add dilute ammonia solution drop by drop until the silver oxide is just dissolved.

Tollens test: dip a small piece of Diaglass slides in a test tube containing 2 ml of the tollen's reagent and then heat the tube in a water bath at 60° during a few minutes. The silver mirror will appear on the Diaglass surface.

The level of aldehyde on the surface influence the yield of capture probes which are bound on the chips. This has been illustrated in example 3. This yield of capture DNA probe fixation in spotting conditions is a good characterization method of the aldehyde content of the glass since it gives the exact estimation of the final result expected for the use of these glasses. A yield of 67% fixation was currently obtained in these working conditions with spotting of 150 nM capture probes solutions versus 10% for the telechem glass slides.

What is claimed is:

1. A method for making microarrays comprising the steps:
   a) subjecting a surface of a solid support to an oxidation of olefinic groups present on said surface in an aqueous solution selected from the group consisting of an aqueous permanganate solution, an aqueous periodate solution, and an aqueous permanganate and periodate solution in order to allow the formation of aldehyde functions upon the surface of said solid support as an end product of said oxidation; and
   b) covalently binding upon said aldehyde functions capture DNA nucleotide sequences designed for the detection, the identification, the quantification and/or the recovery of complementary target biological or chemical molecules of interest; said covalent binding resulting in an array comprising a density of at least 4 or more discrete regions/cm$^2$ of solid support surface, each of said discrete surface regions being bound with a species of said capture DNA nucleotide sequences and wherein at least 220 fmole of DNA molecules/cm$^2$ are fixed to the surface of said solid support.

2. The method according to claim 1, wherein the solid support surface has been previously modified by the addition of olefinic groups upon said surface.

3. The method according to claim 1, wherein the solid support surface is made of a glass layer.

4. The method according to claim 3, wherein the surface of the glass layer is modified by the addition of olefinic silane.

5. The method according to claim 1, wherein the capture DNA nucleotide sequences are able to bind specific target chemical molecules obtained by combinatorial chemistry.

6. The method of claim 1, wherein step (b) is performed by an arrayer.

* * * * *